United States Patent
Lorenz et al.

(10) Patent No.: US 10,926,596 B2
(45) Date of Patent: Feb. 23, 2021

(54) SUSPENSION SYSTEM

(71) Applicant: ArvinMeritor Technology, LLC, Troy, MI (US)

(72) Inventors: Edwin D. Lorenz, Grand Blanc, MI (US); Adam P. Sadlik, Clarkston, MI (US); Michael Schlundt, Royal Oak, MI (US); Rituja D. Marathe, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 2 days.

(21) Appl. No.: 16/288,256

(22) Filed: Feb. 28, 2019

(65) Prior Publication Data

US 2020/0276874 A1   Sep. 3, 2020

(51) Int. Cl.
| | | |
|---|---|---|
| *B60G 7/00* | (2006.01) | |
| *B60G 3/20* | (2006.01) | |
| *B60G 15/12* | (2006.01) | |
| *B60G 21/00* | (2006.01) | |
| *B62D 7/18* | (2006.01) | |

(52) U.S. Cl.
CPC .............. *B60G 7/008* (2013.01); *B60G 3/20* (2013.01); *B60G 15/12* (2013.01); *B60G 21/005* (2013.01); *B62D 7/18* (2013.01); *B60G 2200/144* (2013.01); *B60G 2202/152* (2013.01); *B60G 2202/24* (2013.01); *B60G 2204/148* (2013.01); *B60G 2204/418* (2013.01)

(58) Field of Classification Search
CPC . B62D 7/18; B60G 7/008; B60G 3/20; B60G 2200/144; B60G 2204/148; B60G 2204/1484; B60G 2204/4102; B60G 2204/418; B60G 2204/43; B60G 2206/50; B60G 15/08; B60G 15/12; B60G 21/005; B60G 21/055; B60G 21/0551; B60G 11/26; B60G 11/27; B60G 2202/15; B60G 2202/152; B60G 2202/24; B60G 2202/242

See application file for complete search history.

(56) References Cited

U.S. PATENT DOCUMENTS

| | | |
|---|---|---|
| 2,866,651 A | 6/1956 | Powell |
| 2,971,772 A | 2/1961 | Tantlinger et al. |

(Continued)

FOREIGN PATENT DOCUMENTS

| | | |
|---|---|---|
| BR | P10405014 A | 6/2006 |
| CN | 204399316 U | 6/2015 |

(Continued)

OTHER PUBLICATIONS

Reyco Granning Suspensions, Owner's Manual for Motorhome Suspensions IFS1460S2, Independent Front Suspension, May 2012, 64 pages, Mount Vernon, Missouri, U.S.

(Continued)

*Primary Examiner* — Laura Freedman
(74) *Attorney, Agent, or Firm* — Brooks Kushman PC

(57) ABSTRACT

A suspension system having a knuckle carrier. A pivot mechanism may pivotally couple a control arm to the knuckle carrier. The pivot mechanism may include a preload nut that may exert a preload force on a bearing assembly. A platform may be fixedly disposed on the knuckle carrier. The platform may support an air spring and may have an arm that is coupled to a stabilizer bar subassembly.

20 Claims, 8 Drawing Sheets

(56) References Cited

U.S. PATENT DOCUMENTS

| | | | |
|---|---|---|---|
| 2,998,264 A | 8/1961 | Stump | |
| 3,007,716 A | 11/1961 | Maharick | |
| 3,477,738 A | 11/1969 | Manning | |
| 4,174,855 A | 11/1979 | Vandenberg | |
| 4,274,338 A | 6/1981 | Uozumi | |
| 4,313,619 A | 2/1982 | Hailer | |
| 4,813,704 A | 3/1989 | Smith | |
| 4,871,187 A * | 10/1989 | Schaible | B60G 3/265 280/124.136 |
| 4,974,872 A | 12/1990 | Riese | |
| 5,348,337 A * | 9/1994 | Ando | B60G 3/265 280/124.143 |
| 5,396,968 A | 3/1995 | Hasebe et al. | |
| 5,413,462 A | 5/1995 | Alberni | |
| 5,879,265 A | 3/1999 | Bek | |
| 5,927,417 A | 7/1999 | Brunner et al. | |
| 6,027,130 A * | 2/2000 | Kawabe | B60G 3/265 280/124.135 |
| 6,116,626 A | 9/2000 | Cherry et al. | |
| 6,290,244 B1 | 9/2001 | Hosoya | |
| 6,349,782 B1 | 2/2002 | Sekiya et al. | |
| 6,357,769 B1 | 3/2002 | Omundson et al. | |
| 6,357,793 B1 * | 3/2002 | Dickie | A61G 5/10 16/20 |
| 6,428,027 B1 | 8/2002 | Stuart | |
| 6,736,232 B1 * | 5/2004 | Bergstrom | B60G 3/20 180/292 |
| 6,840,525 B1 | 1/2005 | Griffiths | |
| 6,866,295 B2 | 3/2005 | Ziech et al. | |
| 7,152,866 B2 * | 12/2006 | Chalin | B60G 3/20 280/86.5 |
| 7,461,851 B2 * | 12/2008 | Yamamura | B60G 3/20 180/311 |
| 7,464,779 B2 | 12/2008 | Grabmaier et al. | |
| 7,819,411 B2 | 10/2010 | Eshelman et al. | |
| 7,971,890 B2 | 7/2011 | Richardson | |
| 8,402,878 B2 | 3/2013 | Schreiner et al. | |
| 8,579,308 B2 | 11/2013 | Weeks et al. | |
| 8,640,801 B2 | 2/2014 | Hennings et al. | |
| 8,678,118 B2 | 3/2014 | Takenaka et al. | |
| 8,783,993 B2 * | 7/2014 | Brunneke | F16F 1/3842 403/133 |
| 8,960,341 B2 | 2/2015 | Weber | |
| 9,221,494 B2 | 12/2015 | Hestermeyer et al. | |
| 9,221,496 B2 | 12/2015 | Barr et al. | |
| 9,266,423 B2 | 2/2016 | Hoshinoya et al. | |
| 9,469,172 B2 * | 10/2016 | Andersson | B62D 21/11 |
| 9,533,711 B2 | 1/2017 | Hirsch et al. | |
| 9,649,923 B2 * | 5/2017 | Perlo | B60G 3/20 |
| D814,979 S | 4/2018 | Cantuern et al. | |
| 2002/0163174 A1 | 11/2002 | Bell et al. | |
| 2003/0064846 A1 | 4/2003 | Klemen et al. | |
| 2003/0098564 A1 | 5/2003 | Vandenberg et al. | |
| 2003/0122340 A1 | 7/2003 | Varela | |
| 2004/0094927 A1 | 5/2004 | Nagreski | |
| 2004/0150142 A1 | 8/2004 | Warinner et al. | |
| 2004/0183271 A1 | 9/2004 | Galazin et al. | |
| 2006/0192361 A1 | 8/2006 | Anderson et al. | |
| 2006/0208447 A1 | 9/2006 | Eshelman et al. | |
| 2007/0259747 A1 | 11/2007 | Thomas et al. | |
| 2008/0179116 A1 | 7/2008 | Ikenoya et al. | |
| 2008/0315546 A1 | 12/2008 | Kucinski et al. | |
| 2009/0014223 A1 | 1/2009 | Jones et al. | |
| 2009/0057050 A1 | 3/2009 | Shino et al. | |
| 2010/0025131 A1 | 2/2010 | Gloceri et al. | |
| 2010/0038877 A1 | 2/2010 | Cortez et al. | |
| 2010/0117318 A1 | 5/2010 | Grozev et al. | |
| 2010/0276901 A1 | 11/2010 | Richardson et al. | |
| 2011/0214947 A1 | 9/2011 | Tuomas | |
| 2013/0175779 A1 | 7/2013 | Kvien et al. | |
| 2014/0182954 A1 | 7/2014 | Weber | |
| 2014/0327220 A1 | 11/2014 | Holt et al. | |
| 2015/0266373 A1 | 9/2015 | Wang | |
| 2016/0076610 A1 | 3/2016 | White et al. | |
| 2017/0320365 A1 | 11/2017 | Lorenz et al. | |
| 2017/0320366 A1 | 11/2017 | Milton et al. | |
| 2017/0320367 A1 | 11/2017 | Milton et al. | |
| 2017/0320382 A1 | 11/2017 | Milton et al. | |
| 2017/0320522 A1 | 11/2017 | Lorenz et al. | |
| 2018/0237070 A1 | 8/2018 | Lorenz et al. | |
| 2019/0144034 A1 * | 5/2019 | Bertassi | B60G 11/27 280/93.512 |

FOREIGN PATENT DOCUMENTS

| | | | |
|---|---|---|---|
| DE | 3136305 A1 | 3/1983 | |
| DE | 19860230 A1 | 2/2000 | |
| DE | 102011084858 A1 | 4/2013 | |
| DE | 212013000235 U1 | 7/2015 | |
| EP | 0931684 A1 | 7/1999 | |
| EP | 0742113 B1 | 10/2001 | |
| EP | 1724130 A1 | 11/2006 | |
| EP | 1900554 B1 | 11/2011 | |
| EP | 1628854 B1 | 7/2012 | |
| EP | 3 241 692 A1 | 11/2017 | |
| JP | 03213414 A * | 9/1991 | B60G 3/20 |
| JP | 10664419 A | 3/1994 | |
| WO | 0123245 A1 | 4/2001 | |
| WO | 200151300 A1 | 7/2001 | |
| WO | 2015110965 A2 | 7/2015 | |
| WO | 2017196633 A1 | 11/2017 | |
| WO | 2017196776 A1 | 11/2017 | |
| WO | 2017196778 A1 | 11/2017 | |

OTHER PUBLICATIONS

ZF Friedrichshafen AG, Independent Front Suspension RL 82 EC, printed from the Internet on Feb. 4, 2019 <<https://www.zf.com/products/en/buses/products_39877.html[Feb. 4, 2019 6:18:29 PM]>>.

Extended European Search Report dated Jul. 20, 2020, for related EP Appln. No. 20155071.2; 7 Pages.

Reyco Granning Suspensions, Motorhome Suspensions Owner's Manual, IFS1460S2—Independent Front Suspension, ISO 9001: 2008 Certified, Document #: D705947, Revision K, Revision Date: May 2012, 65 pages, <<www.reycogranning.com>>, Mount Vernon, MO.

Lorenz, et al., U.S. Appl. No. 16/291,456, filed Mar. 4, 2019.

Lorenz, et al., U.S. Appl. No. 16/291,462, filed Mar. 4, 2019.

* cited by examiner

SUSPENSION SYSTEM

TECHNICAL FIELD

This disclosure relates to a suspension system for a vehicle, such as a truck.

A suspension system is disclosed in U.S. Patent Publication No. 2017/0320522.

SUMMARY

In at least one embodiment a suspension system is provided. The suspension system may include a knuckle carrier, a control arm, and a pivot mechanism. The knuckle carrier may define a hole. The pivot mechanism may be disposed in the hole and may pivotally couple the control arm to the knuckle carrier. The pivot mechanism may include a pin, at least one bearing assembly, and a preload nut. The pin may have a shoulder and a threaded portion. The first bearing assembly may receive the pin and may engage the shoulder. The preload nut may have a threaded region that mates with the threaded portion. Tightening the preload nut may exert a preload force on the first bearing assembly.

In at least one embodiment a suspension system is provided. The suspension system may include a knuckle carrier, a steering knuckle, an upper control arm, and a platform. The knuckle carrier may define a mounting stem. The steering knuckle may be pivotally mounted to the knuckle carrier. The upper control arm may be pivotally mounted to the knuckle carrier along a first upper control arm pivot axis. The platform may be fixedly disposed on the mounting stem and may be located above the upper control arm. The platform may support an air spring and may have an arm that is coupled to a stabilizer bar subassembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
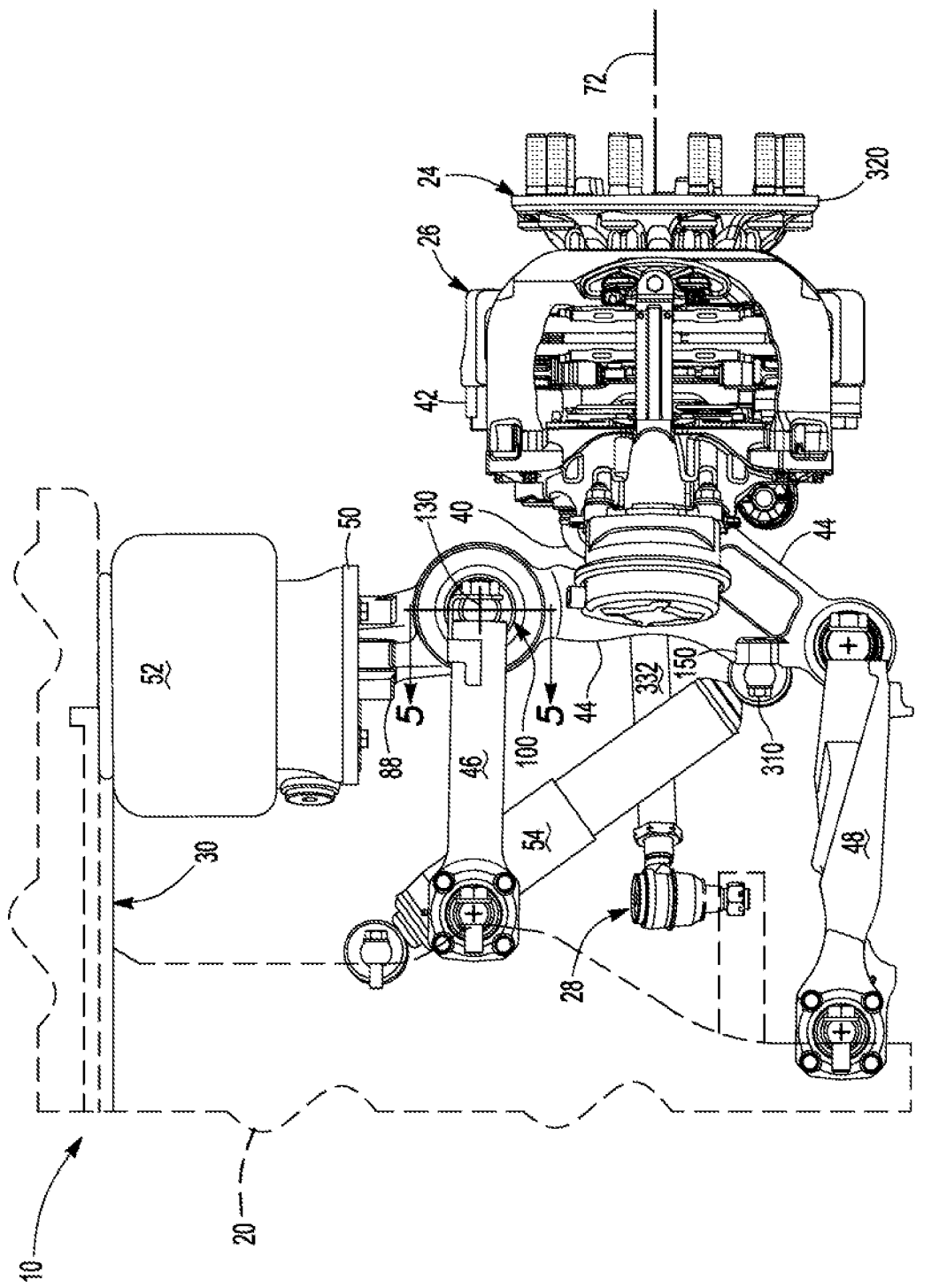
FIG. 1 is a side view of the suspension system.

Referring to FIG. 1, portion of a vehicle 10 is shown. The vehicle 10 may be a motor vehicle like a truck, bus, farm equipment, military transport or weaponry vehicle, or cargo loading equipment for land, air, or marine vessels. In at least one embodiment, the vehicle 10 may include a frame 20, a suspension system 22, a wheel end assembly 24, a brake subsystem 26, a steering subsystem 28, and a stabilizer bar subassembly 30.

The frame 20 may help provide the structure of the vehicle 10. The frame 20 is shown in phantom in FIG. 1 and is omitted in FIGS. 2 and 3 for clarity. In at least one configuration, the frame 20 may include structural members such as frame rails, cross rails that interconnect the frame rails, a subframe, or the like. The frame rails may extend longitudinally or in a direction that may extend between the front and rear of the vehicle 10. The cross rails may extend laterally between the frame rails and may be fixedly attached to the frame rails. The frame 20 may support components of the vehicle 10. For example, the frame may support a vehicle drivetrain and optionally a cab or cabin of the vehicle 10 that may have a passenger compartment that may receive a driver. The frame 20 may also facilitate mounting of the suspension system 22 to the vehicle 10.

Figure 2:
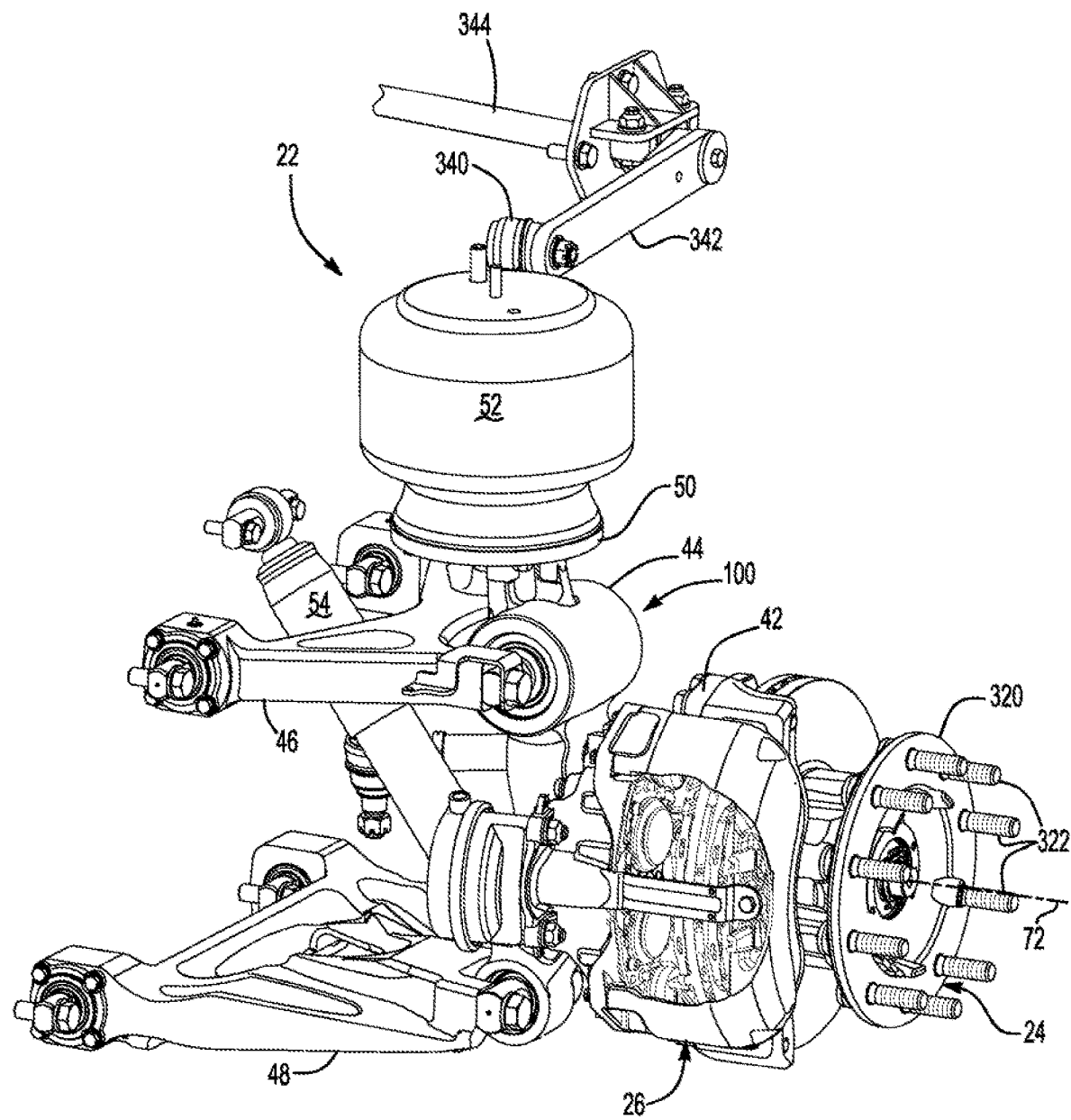
FIGS. 2 and 3 are perspective views of the suspension system of FIG. 1.
Figure 3:
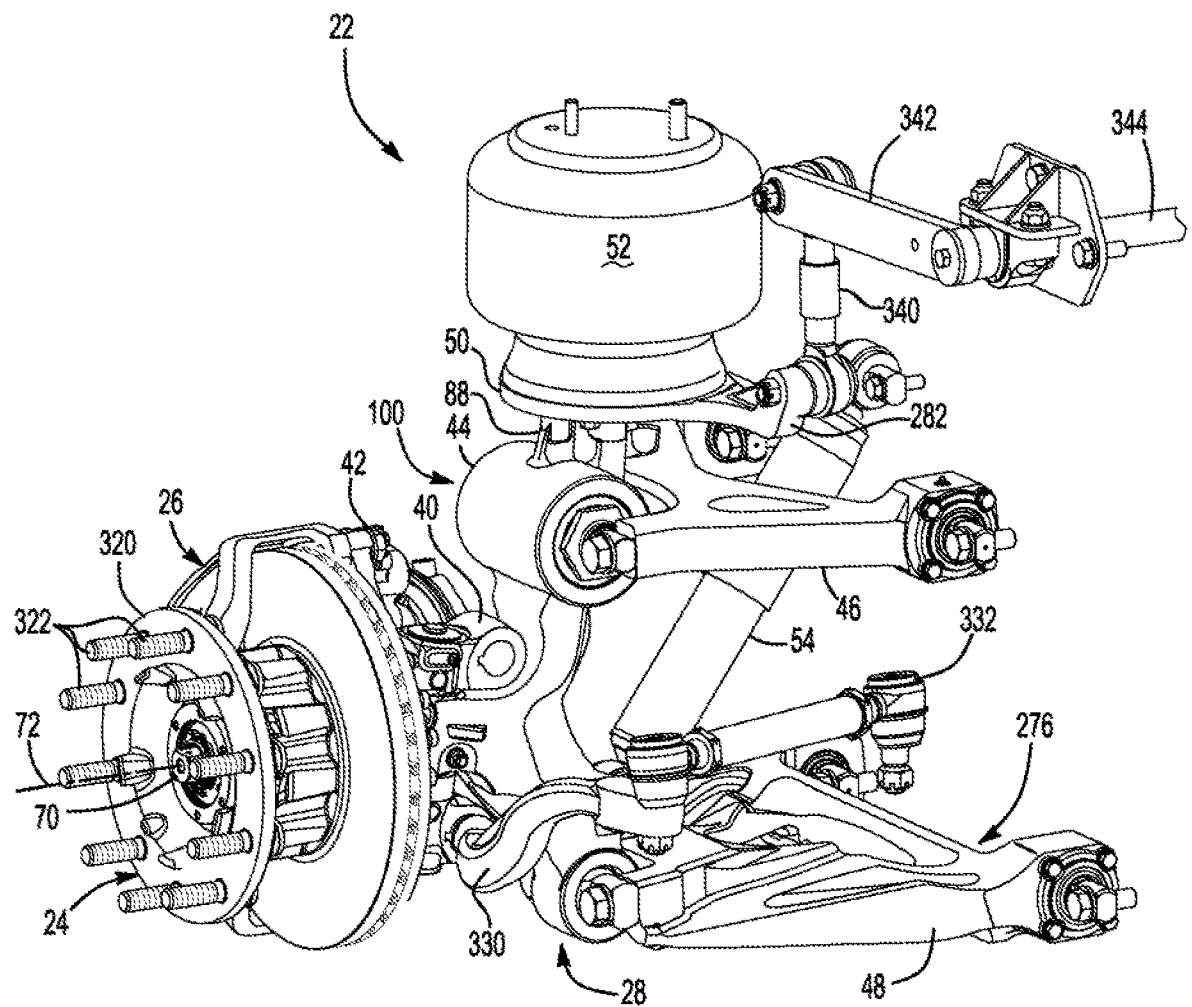

Referring to FIGS. 1-3, the suspension system 22 may connect one or more wheel end assemblies 24 to the frame 20. In addition, the suspension system 22 may dampen vibrations associated with vehicle travel, provide a desired level of ride quality, control vehicle ride height, or combinations thereof. The suspension system 22 may be an independent suspension system that may allow wheels to move up and down independently with respect to each other or without influence from another wheel. FIGS. 1-3 show a portion of the suspension system 22 that is associated with a single wheel; however, is it to be understood that the suspension system 22 may be associated with multiple wheels. For instance, the components of the suspension system 22 that are shown in FIGS. 1-3 may be provided with a wheel like a right front wheel of the vehicle 10 when viewed from a position in front of the vehicle. These components may also be provided as a mirror image when provided with an opposing wheel like a left front wheel. It is also contemplated that the suspension system 22 or components of the suspension system discussed below are not necessarily limited to use with front wheels of a vehicle. In at least one configuration, the suspension system 22 may include a steering knuckle 40, a brake spider 42, a knuckle carrier 44, an upper control arm 46, a lower control arm 48, a platform 50, one or more air springs 52, and one or more shock absorbers 54.

Figure 4:
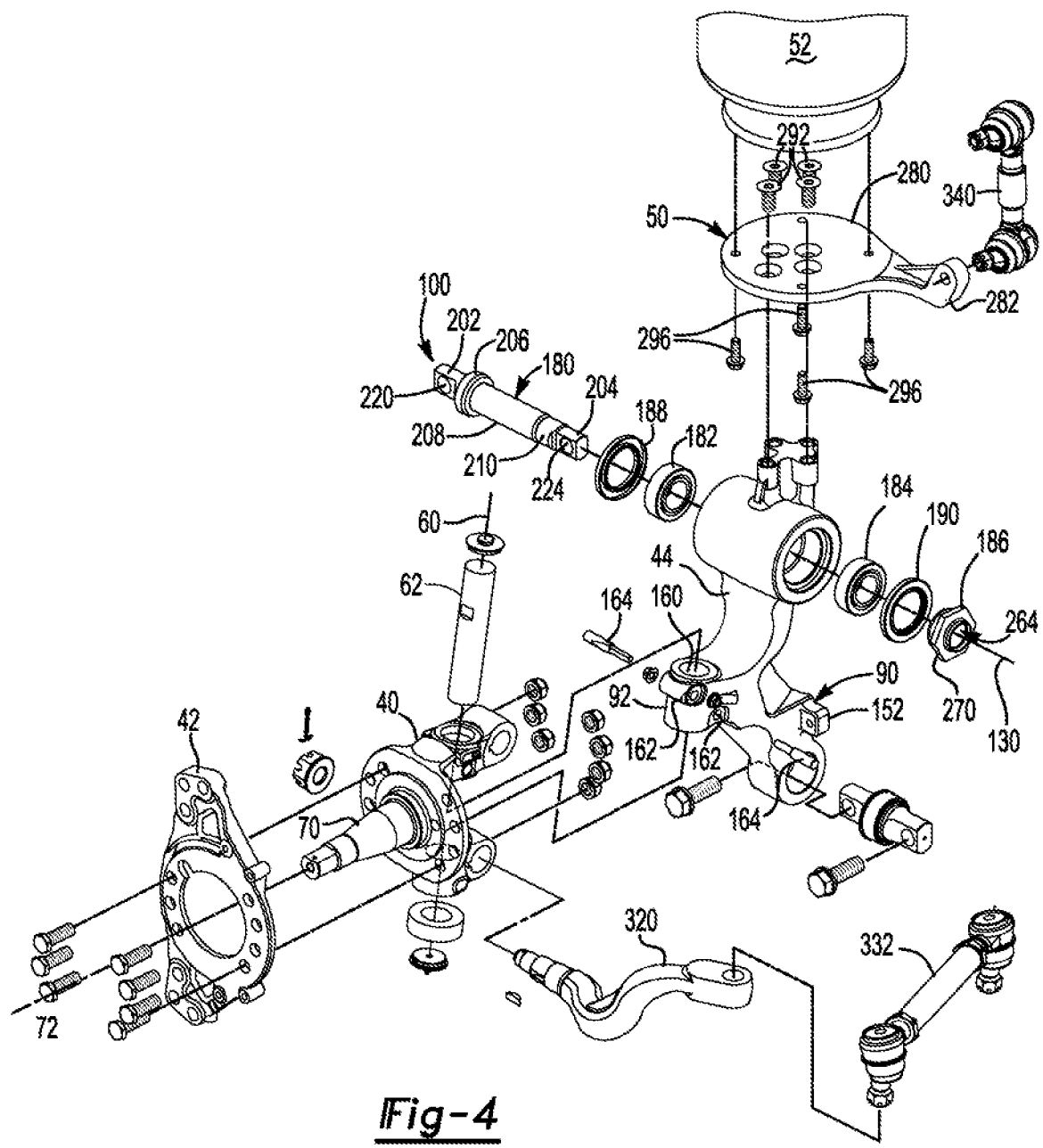
FIG. 4 is an exploded view of a portion of the suspension system.

Referring to FIGS. 1-4, the steering knuckle 40 may interconnect the wheel end assembly 24 to the knuckle carrier 44. The steering knuckle 40 may be rotatable about a first axis 60 with respect to the knuckle carrier 44, the upper control arm 46, and the lower control arm 48 to steer or change the direction of travel of the vehicle 10. As an example and as is best shown in FIG. 4, the steering knuckle 40 may receive and may rotate about a kingpin 62 that may extend along the first axis 60 and may be fixedly disposed on the knuckle carrier 44. The steering knuckle 40 may be operatively connected to the steering subsystem 28 as will be discussed in more detail below.

Referring primarily to FIGS. 3 and 4, the steering knuckle 40 may facilitate mounting of the wheel end assembly 24 and the brake subsystem 26. For example, the steering knuckle 40 may have a spindle 70 that may rotatably support the wheel end assembly 24. The spindle 70 may support one or more wheel bearings that rotatably support a hub of the wheel end assembly 24 and allow the hub and an associated wheel to rotate about a second axis 72. In a drive axle configuration, an axle may extend through the spindle 70 and may provide torque to a corresponding hub and wheel. The steering knuckle 40 may also facilitate mounting of the brake spider 42.

The brake spider 42 may facilitate mounting of the brake subsystem 26 to the steering knuckle 40. For example, a portion of the brake subsystem 26, such as a brake caliper, may be fixedly mounted to the brake spider 42. The brake spider 42 may be fixedly disposed on the steering knuckle 40 in any suitable manner. For instance, the brake spider 42 may be mounted to the steering knuckle 40 with a plurality of fasteners, such as bolts.

Referring to FIG. 3, the knuckle earlier 44 may interconnect the steering knuckle 40 to the upper control arm 46 and the lower control arm 48. As is best shown with reference to FIGS. 7 and 8, in at least one configuration the knuckle carrier 44 may include a first side 80, a second side 82, an upper hole 84, a lower hole 86, a mounting stem 88, a shock absorber mount 90, a neck portion 92, and a connecting web 94.

The first side 80 may face toward the front of the vehicle 10. The first side 80 may extend in a generally vertical direction.

The second side 82 may be disposed opposite the first side 80. As such, the second side 82 may face toward the rear of the vehicle 10. The second side 82 may also extend in a generally vertical direction.

The upper hole 84 may extend between the first side 80 and the second side 82. The upper hole 84 may facilitate mounting of the upper control arm 46. For example, the upper hole 84 may be a through hole and may receive a pivot mechanism 100, which is shown in FIGS. 1-5, that pivotally connects the upper control arm 46 to the knuckle carrier 44 as will be discussed in more detail below.

Figure 5:
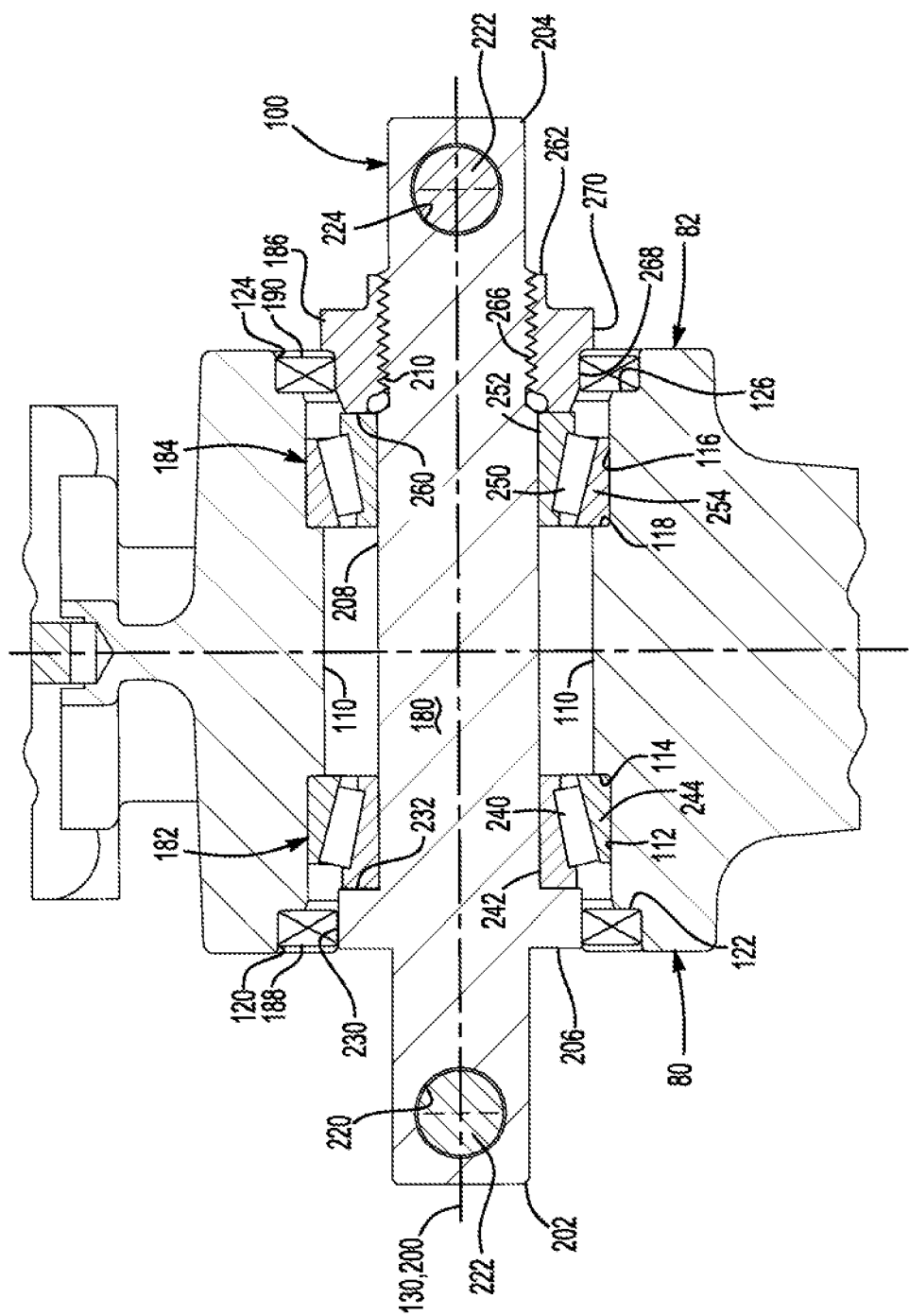
FIG. 5 is a section view along section line 5-5.

Referring to FIG. 5, a cross-sectional view through the center of the upper hole 84 is shown. The upper hole 84 may be defined by multiple surfaces or features of the knuckle carrier 44, such as an intermediate portion 110, a first bearing support surface 112, and a first step surface 114, The upper hole 84 may also be defined by a second bearing support surface 116, a second step surface 118, a first seal support surface 120, a first outer step surface 122, a second seal support surface 124, and/or a second outer step surface 126. Although these surfaces are shown with respect to the upper hole 84, it is contemplated that another hole may be provided with this configuration to accommodate the pivot mechanism 100, such as the lower hole 86.

The intermediate portion 110 may be disposed proximate the center of the upper hole 84. The intermediate portion 110 may have a smaller diameter than the first bearing support surface 112 and the second bearing support surface 116.

The first bearing support surface 112 may be axially positioned between the first side 80 and the intermediate portion 110. For example, the first bearing support surface 112 may be axially positioned between the first step surface 114 and the first outer step surface 122. The first bearing support surface 112 may have a larger diameter than the intermediate portion 110.

The first step surface 114 may extend from the intermediate portion 110 to the first bearing support surface 112. For instance, the first step surface 114 may extend from a first end of the intermediate portion 110 to an end of the first bearing support surface 112. The first step surface 114 may be disposed substantially perpendicular to a center axis of the upper hole 84. The center axis may be referred to as a first upper control arm pivot axis 130 and may be an axis about which the knuckle carrier 44 may pivot with respect to the upper control arm 46.

The second bearing support surface 116 may be axially positioned between the second side 82 and the intermediate portion 110. For example, the second bearing support surface 116 may be axially positioned between the second step surface 118 and the second outer step surface 126. The second bearing support surface 116 may have a larger diameter than the intermediate portion 110. In addition, the second bearing support surface 116 may optionally have the same diameter as the first bearing support surface 112.

The second step surface 118 may extend from the intermediate portion 110 to the second bearing support surface 116. For instance, the second step surface 118 may extend from a second end of the intermediate portion 110 that may be disposed opposite the first bearing support surface 112 to an end of the second bearing support surface 116. The second step surface 118 may be disposed substantially perpendicular to the first upper control arm pivot axis 130.

The first seal support surface 120 may be axially positioned between the first side 80 and the first bearing support surface 112. For instance, the first seal. support surface 120 may be axially positioned between the first side 80 and the first outer step surface 122. The first seal support surface 120 may have a larger diameter than the first bearing support surface 112.

The first outer step surface 122 may extend from the first bearing support surface 112 to the first seal support surface 120. For example, the first outer step surface 122 may extend from an end of the first bearing support surface 112 that is disposed opposite the first step surface 114 to an end of the first seal support surface 120. The first outer step surface 122 may be disposed substantially perpendicular to the first upper control arm pivot axis 130.

The second seal. support surface 124 may be axially positioned between the second side 82 and the second bearing support surface 116. For instance, the second seal support surface 124 may be axially positioned between the second side 82 and the second outer step surface 126. The second seal support surface 124 may have a larger diameter than the first bearing support surface 112. In addition, the second seal support surface 124 may optionally have the same diameter as the first seal support surface 120.

The second outer step surface 126 may extend from the second bearing support surface 116 to the second seal support surface 124. For example, the second outer step surface 126 may extend from and end of the second bearing support surface 116 that may be disposed opposite the second step surface 118 to an end of the second seal support surface 124. The second outer step surface 126 may be disposed substantially perpendicular to the first upper control arm pivot axis 130.

Figure 7:
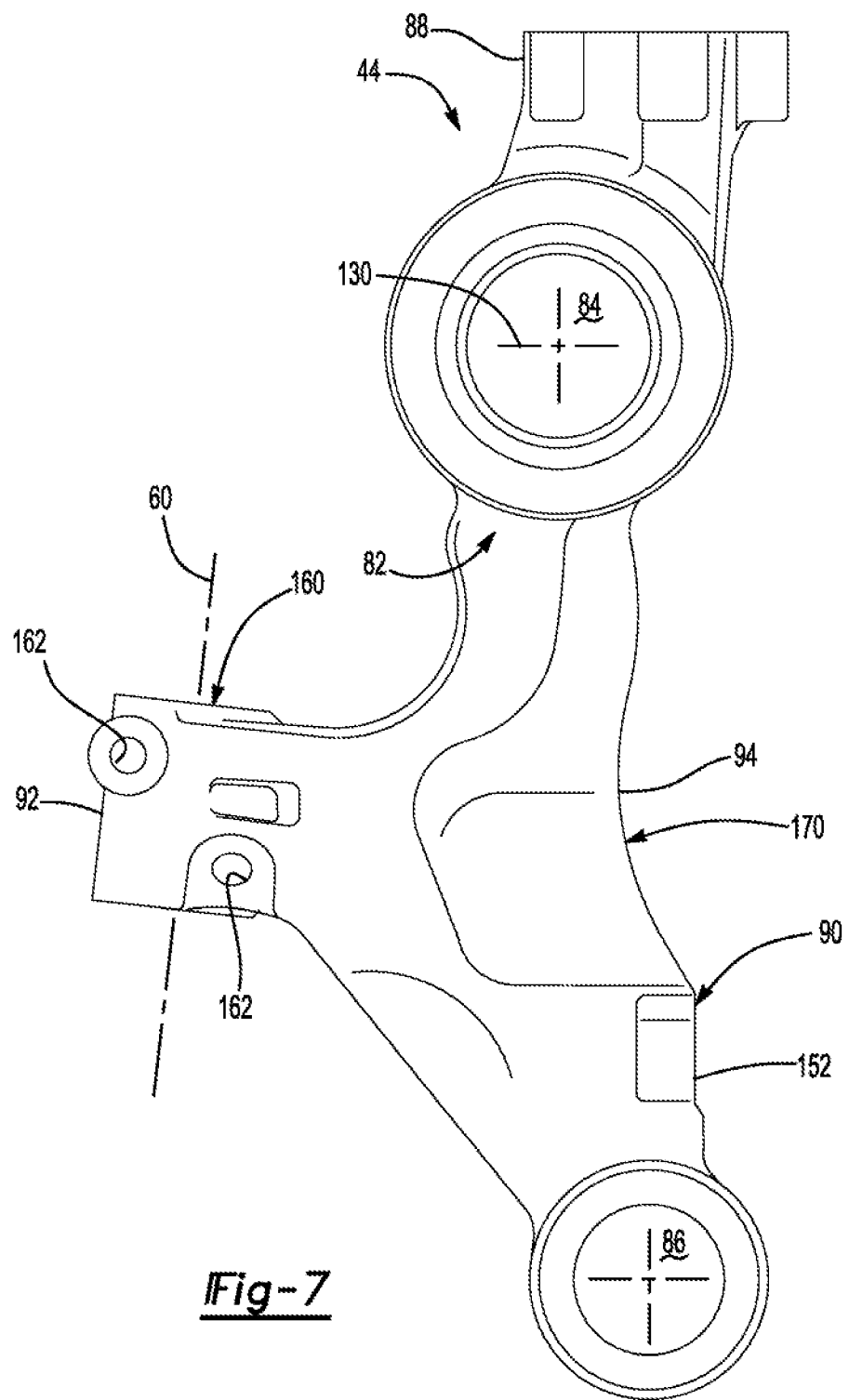
FIG. 7 is a rear side view of a knuckle carrier that may be provided with the suspension system.
Figure 8:
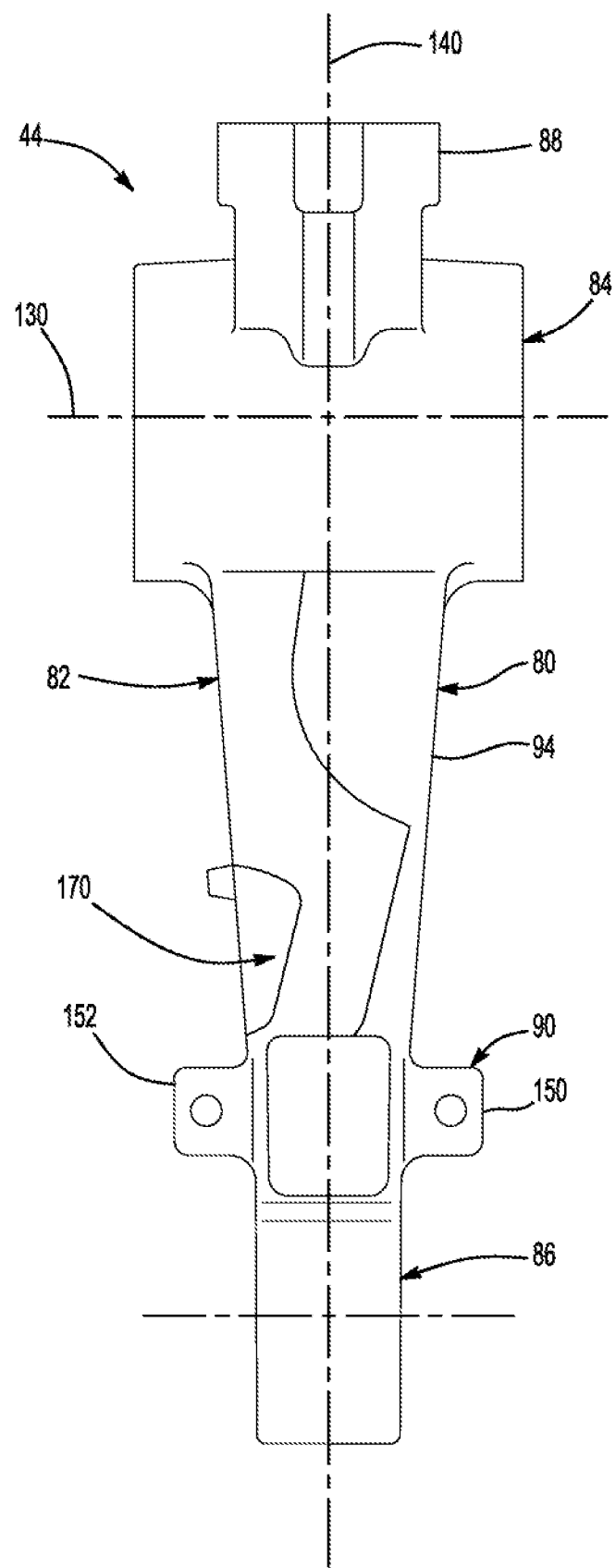
FIG. 8 is an inboard side view of the knuckle carrier.

Referring to FIGS. 7 and 8, the lower hole 86 of the knuckle carrier 44 may extend between the first side 80 and the second side 82. In addition, the lower hole 86 may be disposed proximate the bottom of the knuckle carrier 44. As such, the lower hole 86 may be disposed below the upper hole 84, mounting stem 88, shock absorber mount 90, neck portion 92, and the connecting web 94. The lower hole 86 may facilitate mounting of the lower control arm 48. For example, the lower hole 86 may be a through hole that may receive a pivot mechanism that pivotally connects the lower control arm 48 to the knuckle carrier 44.

The mounting stem 88 may be located between the first side 80 and the second side 82. As is best shown in FIG. 8, the mounting stem 88 may intersect or may be disposed along a center plane 140 of the knuckle carrier 44. The center plane 140 may be a vertical plane that may generally the knuckle carrier 44.

The shock absorber mount 90 may facilitate mounting of a shock absorber 54 as will be discussed in more detail below. The shock absorber mount 90 may be disposed below the upper hole 84 and above the lower hole 86. The shock absorber mount 90 may have a first mounting tab 150 and a second mounting tab 152.

The first mounting tab 150 may extend from or protrude from the first side 80 of the knuckle carrier 44. The first mounting tab 150 may be disposed along a side of the knuckle carrier 44 that faces away from the neck portion 92. The first mounting tab 150 may include a hole that may receive a fastener, such as a bolt, that may facilitate mounting of the shock absorber 54 to the knuckle carrier 44. For example, a pivot mechanism may be mounted to the first mounting tab 150 and may facilitate pivotal movement of the shock absorber 54 with respect to the knuckle carrier 44.

The second mounting tab 152 may be disposed opposite the first mounting tab 150. As such, the second mounting tab 152 may extend from or protrude from the second side 82 of the knuckle earlier 44. The second mounting tab 152 may also be disposed along a side of the knuckle carrier 44 that faces away from the neck portion 92. The second mounting tab 152 may include a hole that may receive a fastener that may facilitate mounting of the shock absorber 54 to the knuckle carrier 44 as previously discussed.

Referring to FIGS. 4 and 7, the neck portion 92 may facilitate mounting of the steering knuckle 40 to the knuckle carrier 44. The neck portion 92 may be positioned below the upper hole 84 and above the lower hole 86. In addition, the neck portion 92 may be positioned above the shock absorber mount 90. The neck portion 92 may protrude from the knuckle carrier 44 toward the steering knuckle 40. The neck portion 92 may include a kingpin bole 160 that may receive the kingpin 62. One or more fastener holes 162 may extend through the neck portion 92 and may intersect the kingpin hole 160. A fastener hole may receive a fastener 164, such as a draw key, that may inhibit movement of the kingpin 62 along the first axis 60 with respect to the knuckle carrier 44.

Referring to FIGS. 7 and 8, the connecting web 94 may extend from the upper hole 84 to the shock absorber mount 90. As is best shown in FIG. 8, the connecting web 94 may be asymmetrical and may be offset from the center plane 140 toward the first side 80 of the knuckle carrier 44. As such, the connecting web 94 may extend to the first mounting tab 150 to partially define the first side 80 and may not extend to the second mounting tab 152. The connecting web 94 may partially define a clearance recess 170. The clearance recess 170 may be disposed between the connecting web 94 and the second side 82 of the knuckle carrier 44. The clearance recess 170 may extend from the second side 82 toward the first side 80 and may extend upward from the shock absorber mount 90 toward the upper hole 84. The clearance recess 170 may extend upward to approximately the top of the neck portion 92 and may provide clearance tier one or more components of the steering subsystem 28 when the steering knuckle 40 is rotated about the first axis 60. Accordingly, the clearance recess 170 may help increase the total steering angle or range of rotation of the steering knuckle 40 about the first axis 60.

Referring to FIGS. 4 and 5, an example of a pivot mechanism 100 is shown. The pivot mechanism 100 may rotatably connect or pivotally couple a control arm to the knuckle carrier 44. The pivot mechanism 100 may be at least partially disposed in a hole in the knuckle carrier 44. For example, the pivot mechanism 100 will be primarily described below in the context of being disposed in the upper hole 84 of the knuckle carrier 44 to facilitate rotation of the upper control arm 46 about the first upper control arm pivot axis 130; however, it is contemplated that the pivot mechanism 100 could be employed in different locations or with different components. For instance, the pivot mechanism 100 may also be configured to couple the lower control arm 48 to a suitably configured lower hole 86 or may be used to couple the upper control arm 46, lower control arm 48, or both to the frame 20. In at least one configuration, the pivot mechanism 100 may include a pin 180, a first bearing assembly 182, a second bearing, assembly 184, and a preload nut 186. In addition, the pivot mechanism 100 may also include at least one seal, such as a first seal 188 and a second seal 190.

The pin 180 may be partially received in the upper hole 84. The pin 180 may extend along a pin axis 200 that may be coaxially disposed with the first upper control arm pivot axis 130 after assembly. In at least one configuration, the pin 180 may include a first end portion 202, a second end portion 204, a shoulder 206, a center portion 208, arid a threaded portion 210.

The first end portion 202 may extend from a first end surface of the pin 180. The first end portion 202 may be disposed outside of the upper hole 84 and may include a first mounting hole 220. The first mounting hole 220 may be a through hole that may be configured to receive a fastener 222, such as a bolt, that may couple or mount the, pin 180 to a control arm, such as the upper control arm 46.

The second end portion 204 may be disposed opposite the first end portion 202. The second end portion 204 may extend from a second end surface of the pin 180 that may be disposed opposite the first end surface. The second end portion 204 may be disposed outside of the upper hole 84 and may include a second mounting hole 224. The second mounting hole 224 may be a through hole that may be configured to receive a fastener 222 that may couple or mount the pin 180 to the control arm. Accordingly, the pin 180 may not rotate with respect to the upper control arm 46 and may rotate with the upper control arm 46 about the pin axis 200 with respect to the knuckle carrier 44.

The shoulder 206 may be axially positioned between the first end portion 202 and the second end portion 204. For example, the shoulder 206 may be axially positioned between the first end portion 202 and the center portion 208. The shoulder 206 may be partially or completely received in the upper hole 84. The shoulder 206 may extend further from the pin axis 200 than the first end portion 202, second end portion 204, center portion 208, threaded portion 210, or combinations thereof. The shoulder 206 may have an outer shoulder surface 230 that may face away from the pin axis 200 and may extend around the pin axis 200. In at least one configuration, the outer shoulder surface 230 may be in outside circumference of the shoulder 206 and may be disposed at a substantially constant radial distance from the pin axis 200. The shoulder 206 may also have a shoulder side surface 232 that may extend from the outer shoulder surface 230 to the center portion 208.

The center portion 208 may be axially positioned between the shoulder 206 and the threaded portion 210. The center portion 208 may be received in the upper hole 84. The center portion 208 may have an outside circumferential surface that may face away from the pin axis 200 and may extend from the shoulder 206 to or toward the threaded portion 210. The outside circumferential surface may support the first bearing assembly 182 and the second bearing assembly 184 and may be disposed closer to the pin axis 200 or have a smaller diameter than the outer shoulder surface 230.

The threaded portion 210 may be axially positioned between the center portion 208 and the second end portion 204. As such, the shoulder 206, the center portion 208, and the threaded portion 210 may be axially positioned between the first mounting hole 220 and the second mounting hole 224. The threaded portion 210 may be disposed inside the upper hole 84, outside the upper hole 84, or may be partially disposed in the upper hole 84. In at least one configuration, the threaded portion 210 may be disposed closer to the pin axis 200 than the center portion 208 and may be disposed further from the pin axis 200 than the second end portion 204.

The first bearing assembly 182 may rotatably support the pin 180. The first bearing assembly 182 may be disposed in the upper hole 84 and may have any suitable configuration. For example, the first bearing assembly 182 may be configured as a roller bearing assembly that may include a plurality of rolling elements 240 that may be disposed between a first inner race 242 and a first outer race 244.

The first inner race 242 may receive the pin 180. For example, the first inner race 242 may extend around and may engage the center portion 208 of the pin 180. In addition, the first inner race 242 engage or contact the shoulder side surface 232 of the shoulder 206 of the pin 180. As such, the shoulder 206 may inhibit axial movement of the first inner race 242 in a direction that extends away from the second bearing assembly 184 or to the left from the perspective shown in FIG. 5.

The first outer race 244 may extend around the rolling elements 240 and the first inner race 242. The first outer race 244 may engage the knuckle carrier 44. For example, the first outer race 244 may be disposed on the first bearing support surface 112 and may engage or contact the first step surface 114 of the knuckle carrier 44. As such, the first step surface 114 may inhibit axial movement of the first outer race 244 toward the second bearing assembly 184.

The second bearing assembly 184 may also rotatably support the pin 180. The second bearing assembly 184 may be disposed in the upper hole 84 and may have any suitable configuration. For example, the second bearing assembly 184 may be configured as a roller bearing assembly that may include a plurality of rolling elements 250 that may be disposed between a second inner race 252 and a second outer race 254.

The second inner race 252 may receive the pin 180. For example, the second inner race 252 may extend around and may engage the center portion 208 of the pin 180. In addition, the second inner race 252 engage or contact the preload nut 186.

The second outer race 254 may extend around the rolling elements 250 and the second inner race 252. The second outer race 254 may engage the knuckle carrier 44. For example, the second outer race 254 may be disposed on the second bearing support surface 116 and may engage or contact the second step surface 118 of the knuckle carrier 44. As such, the second step surface 118 may inhibit axial movement of the second outer race 254 toward the first outer race 244 of the first bearing assembly 182. In addition, the intermediate portion 110 of the knuckle carrier 44 may extend from the first outer race 244 to the second outer race 254 and may help separate the first bearing assembly 182 from the second bearing assembly 184.

Referring to FIGS. 4 and 5, the preload nut 186 may be configured to exert a preload force on the first bearing assembly 182, the second bearing assembly 184, or both. The preload nut 186 may receive the pin 180. In at least one configuration, the preload nut 186 may include a first end surface 260, a second end surface 262, a hole 264, a threaded region 266, an outer surface 268, and a flange 270.

The first end surface 260 may face toward the second bearing assembly 184. For example, the first end surface 260 may engage the second inner race 252 of the second bearing assembly 184. In at least one configuration, first end surface 260 may be disposed in the upper hole 84 and may be disposed substantially perpendicular to the pin axis 200. It is contemplated that if the second bearing assembly 184 was omitted, the first end surface 260 could engage a surface of the knuckle carrier 44, such as the second step surface 118 and could then be tightened to provide a preload force on the first bearing assembly 182.

The second end surface 262 may be disposed opposite the first end surface 260. As such, the second end surface 262 may face away from the second bearing assembly 184. The second end surface 262 may be disposed substantially perpendicular to the pin axis 200. Optionally, the second end surface 262 may be disposed outside the upper hole 84.

The hole 264, which is best shown in FIG. 4, may extend from the first end surface 260 to the second end surface 262. The hole 264 may receive the pin 180.

The threaded region 266, which is best shown in FIG. 5, may be disposed in the hole 264 and may extend between the first end surface 260 and the second end surface 262. The threaded region 266 may include one or more threads that may mate with the threaded portion 210 of the pin 180.

The outer surface 268 may face away from the pin 180 and the hole 264. In addition, the outer surface 268 may be spaced apart from the knuckle carrier 44. The outer surface 268 may extend from the first end surface 260 to the flange 270. In at least one configuration, the outer surface 268 or a portion thereof may be an outside circumferential surface of the preload nut 186.

The flange 270 may be axially positioned between the outer surface 268 and the second end surface 262. In addition, the flange 270 may be spaced apart from the knuckle carrier 44. In at least one configuration, the flange 270 may extend outward with respect to the outer surface 268 or may extend further away from the pin axis 200 than the outer surface 268. The flange 270 may include a plurality of flats or substantially planar faces that may facilitate engagement with a tool, such as a wrench. The flange 270 may be disposed partially or completely outside the upper hole 84.

Tightening the preload nut 186 may exert a preload force the first bearing assembly 182 and the second bearing assembly 184. For instance, tightening the preload nut 186 may actuate the pin 180 in an axial direction such that the shoulder 206 actuates the first inner race 242 toward the second bearing assembly 184 or to the right from the perspective shown in FIG. 5. The first outer race 244 may be prevented from moving axially in the same direction by the intermediate portion 110 of the knuckle carrier 44. As such, force may be exerted against the rolling elements 240 of the first bearing assembly 182 to provide a desired preload force and to inhibit skidding that may reduce bearing life. In addition, tightening the preload nut 186 may cause the preload nut 186 to exert force against the second inner race 252 in an axial direction that extends toward the first bearing assembly 182 or to the left from the perspective shown in FIG. 5. The second outer race 254 may be prevented from moving, axially in the same direction by the intermediate portion 110. As such, force may be exerted against the rolling elements 250 of the second bearing assembly 184 to inhibit skidding and to provide a desired preload three.

The first seal 188 may inhibit contaminants from entering the end of the upper hole 84 that is disposed proximate the first bearing, assembly 182. The first seal 188 may extend between the pin 180 and the knuckle carrier 44. In at least one configuration, the first seal 188 may extend from the first seal support surface 120 to the outer shoulder surface 230 of the shoulder 206. As such, the first seal 188 may be at least partially disposed in the upper hole 84 and the shoulder 206 may be received in the first seal 188. In addition, the first seal 188 may engage the first outer step surface 122 to inhibit axial movement of the first seal 188 toward the first bearing assembly 182. The first seal 188 may be spaced apart from and may not engage the first bearing assembly 182.

The second seal 190 may inhibit contaminants from entering the end of the upper hole 84 that is disposed proximate the second bearing assembly 184. The second seal 190 may extend between the preload nut 186 and the knuckle carrier 44. In at least one configuration, the second seal 190 may extend from the second seal support surface 124 to the outer surface 268 of the preload nut 186. As such, the second seal 190 may be at least partially disposed in the upper hole 84 and the preload nut 186 may be received in the second seal 190. In addition, the second seal 190 may engage the second outer step surface 126 to inhibit axial movement of the second seal 190 toward the second bearing assembly 184. The second seal 190 may be spaced apart from and may not engage the second bearing assembly 184.

Referring to FIGS. 1-3 and 6, the upper control arm 46 may extend from a lateral side of the frame 20 to a corresponding knuckle carrier 44. An upper control arm 46 may be pivotally or rotatably mounted to the frame 20 along a second upper control arm axis 272 in a manner that allows the steering knuckle 40, knuckle carrier 44, and a corresponding wheel end assembly 24 to move up and down while inhibiting forward and backward movement. For example, the upper control arm 46 may have a pair of arms that may be pivotally coupled to the frame 20 with a pivot mechanism. The pivot mechanism may have any suitable configuration. For example, the pivot mechanism may be like the pivot mechanism 100 described above or may have a simplified design that may include a pivot pin about which the upper control arm 46 may rotate but may not be configured to adjust a bearing preload. The pivot pin may be fixedly coupled to the frame 20 in any suitable manner, such as with one or more fasteners like bolts. As is best shown in FIG. 2, the arms of the upper control arm 46 may also cooperate to partially define an opening through which the shock absorber 54 may extend.

Figure 6:
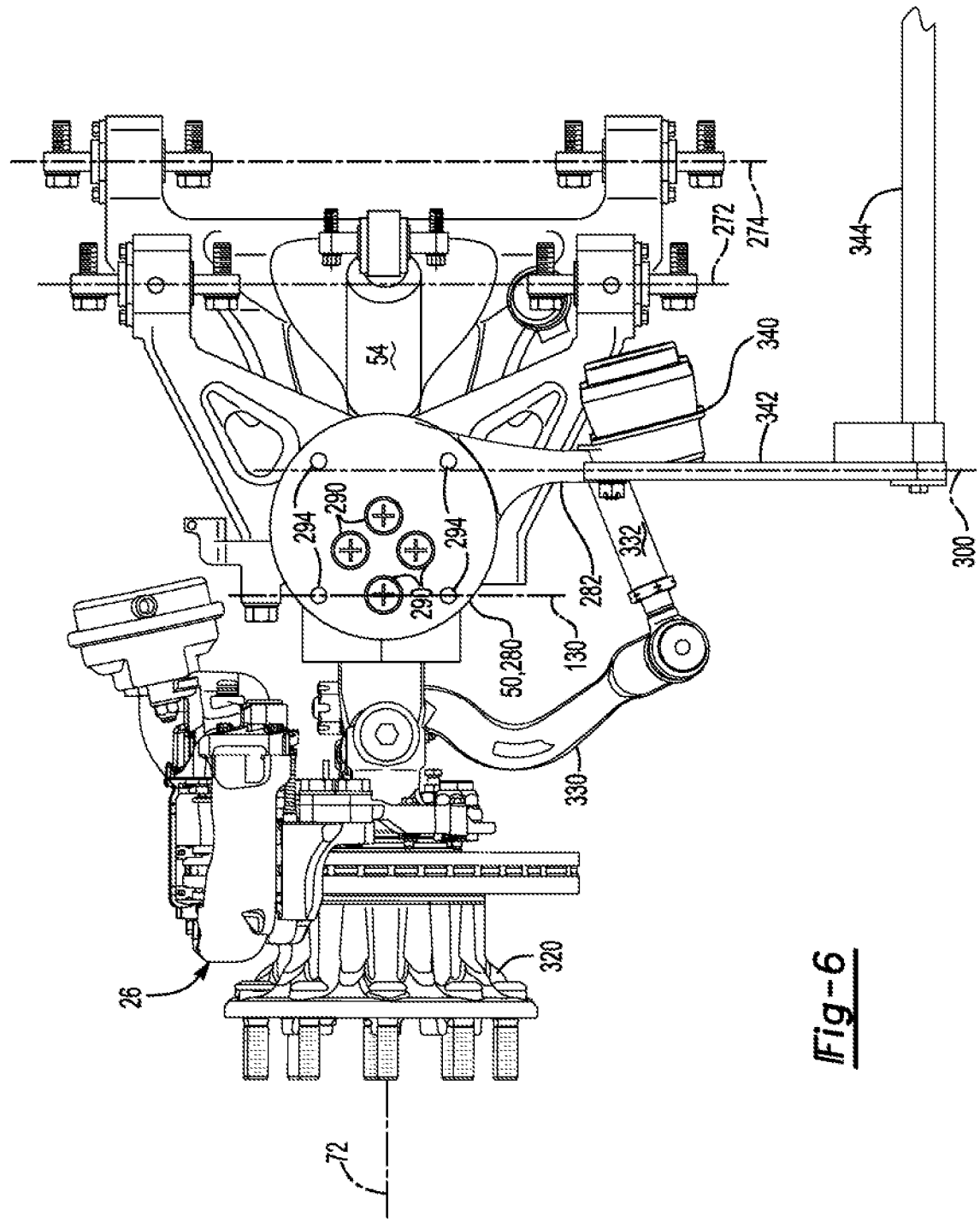
FIG. 6 is top view of a portion of the suspension system.

Referring to FIGS. 1-3, the lower control arm 48 may be disposed below the upper control arm 46. A pair of lower control arms 48 may extend from opposing lateral sides of the frame 20 to a corresponding knuckle carrier 44. A lower control arm 48 may be pivotally or rotatably mounted to the frame 20 in a manner that allows the steering knuckle 40, knuckle carrier 44, and a corresponding wheel end assembly 24 to move up and down while inhibiting forward and backward movement. For example, the lower control arm 48 may have a pair of arms that may be pivotally coupled to the frame 20 with a pivot mechanism that may permit the lower control arm 48 to rotate about an inboard lower control arm axis 274, which is best shown in FIG. 6. The pivot mechanism may have any suitable configuration as previously discussed.

As is best shown in FIG. 3, the lower control arm 48 may include a cut-out 276 or recess that may provide clearance to the steering subsystem 28. The cut-out 276 may be configured as a recess or indentation in the upper side or upper surface of the lower control arm 48 and may provide clearance to a tie rod when the lower control arm 48 is pivoted upward about inboard lower control arm axis 274.

Referring to FIGS. 1-4 and 6, the platform 50 may be fixedly disposed on the knuckle carrier 44. For instance, the platform 50 may be fixedly disposed on the mounting stem 88. In at least one configuration, the platform 50 may be completely located above the knuckle carrier 44, the upper control arm 46, or both. In at least one configuration, the platform 50 may have a disc portion 280 and an arm 282.

Referring primarily to FIGS. 3, 4 and 6, the disc portion 280 may facilitate mounting of the platform 50 to the knuckle carrier 44. In addition, the disc portion 280 may support and facilitate mounting of the air spring 52 to the platform 50. As is best shown in FIG. 6, the disc portion 280 may be generally configured as a circular disk. The disc portion 280 may be mounted to the knuckle carrier 44 in any suitable manner. For instance, the disc portion 280 may have a first set of holes 290 that may receive fasteners 292, such as screws, that may couple the disc portion 280 to the knuckle carrier 44. In addition, the disc portion 280 may have a second set of holes 294 that may receive fasteners 296, such as bolts, that may couple the air spring 52 to the platform 50. The members of the second set of holes 294 may be disposed closer to the outside perimeter or outside circumference of the disc portion 280 than the first set of holes 290.

The arm 282 that may be coupled to the stabilizer bar subassembly 30. As is best shown in FIG. 6, the arm 282 may extend along an arm axis 300. The arm axis 300 may be substantially parallel to the first upper control arm pivot axis 130 and the second upper control arm axis 272. In addition, the arm 282 may extend toward the rear of the vehicle 10 or toward the bottom of FIG. 6 from the perspective shown. As such, the arm 282 may extend in a rearward longitudinal direction or a direction that extends longitudinally between the front and the rear of the vehicle 10 and toward the rear of the vehicle 10. In addition, the arm 282 may be disposed further inboard or further away from the steering knuckle 40 than the first set of holes 290 and may extend tangentially from an inboard side or edge of the disc portion 280.

Referring to FIGS. 1-3, the air spring 52 and the shock absorber 54 may be provided to control and dampen movement of the suspension system 22.

The air spring 52 may be disposed on a top surface of the platform 50. As such, the air spring 52 may extend from the platform 50 upward to the frame 20. The air spring 52 may have any suitable configuration. For instance, the air spring 52 may have a mounting plate, flexible bellows, and a piston. The mounting plate may be disposed at the top of the air spring 52 and may be fixedly mounted to the frame 20, such as with one or more fasteners. The flexible bellows may extend from the mounting plate to the piston. The flexible bellows may at least partially define a chamber within the air spring 52 that may receive the piston and an inflation gas. Inflation gas may be provided to the chamber or may be vented from the chamber to adjust the ride height and dampening characteristics of the suspension system 22. The piston may be at least partially received in the flexible bellows and may fixedly mounted to the platform 50.

The shock absorber 54, which may also be referred to as a strut, may extend from the frame to the knuckle carrier 44. For example, the shock absorber 54 may be pivotally mounted to the frame 20 at a first end and may be pivotally mounted to the first and second mounting tabs 150, 152 of the shock absorber mount 90 at a second end with fasteners 310 such as bolts, Which are best shown in FIG. 1.

Referring to FIGS. 1-3, the wheel end assembly 24 may facilitate rotation a wheel that may support a tire. The Wheel end assembly 24 may be part of a drive axle or a non-drive axle. A drive axle may receive torque from a power source, such as an internal combustion engine or electric motor. In a drive axle configuration, a shaft may transmit torque to the wheel end assembly 24 to rotate a wheel that may be mounted on the wheel end assembly 24, For instance, the shaft may be operatively connected at a first end to a vehicle drivetrain component like a differential, gearbox, or motor and may extend through the steering knuckle 40 and may be coupled to the wheel end assembly 24 at a second end. Such a shaft may be omitted in a non-drive axle configuration. In at least one configuration, the wheel end assembly 24 may include a hub 320.

The hub 320 may be rotatably disposed on the spindle 70 of the steering knuckle 40. For example, one or more wheel bearings may be disposed on the spindle 70 and may rotatably support the hub 320. The hub 320 may facilitate mounting of the wheel, such as with a plurality of mounting studs 322. As such, the hub 320 and the wheel may rotate together about the second axis 72. A tire may be disposed on the wheel that may engage a road or support surface.

Referring to FIGS. 1 and 2, the brake subsystem 26 may facilitate braking of the wheel to slow rotation of the hub 320 and an associated wheel about the second axis 72 of the wheel end assembly 24. The brake subsystem 26 may have any suitable configuration. For instance, the brake subsystem 26 may be configured as a friction brake, such as a disc brake or a drum brake. In the configuration shown, the brake subsystem 26 is configured as a disc brake.

Referring to FIG. 3, a portion of a steering subsystem 28 is shown. The steering subsystem 28 may steer or change the direction of travel of the vehicle. The steering subsystem 28 may include a linkage arrangement that may include a steering arm 330 and a tie rod 332. The steering arm 330 may be is fixedly mounted to the steering knuckle 40. The tie rod 332 may be pivotally coupled to an end of the steering arm 330 and may be operatively connected to a steering gear by one or more additional linkages. The steering gear may actuate the linkage arrangement to rotate the steering knuckle 40 about the first axis 60. The steering gear may be disposed on the frame 20 or may be fixedly positioned with respect to the frame 20.

The stabilizer bar subassembly 30 may help reduce body roll or side-to-side rolling of the vehicle 10, such as may occur during cornering. The stabilizer bar subassembly 30 may operatively connect opposing knuckle carriers 44 of the vehicle 10. For example, the stabilizer bar subassembly 30 may be coupled to an arm 282 of the platform 50 that is disposed on the left side of the vehicle 10 and to a corresponding arm 282 of a platform 50 is disposed on a right side of the vehicle 10. The stabilizer bar subassembly 30 may be disposed above the upper control arm 46 and the knuckle carrier 44. Moreover, the stabilizer bar subassembly 30 may be spaced apart from and may not be coupled to the upper control arm 46 or the lower control arm 48. In at least one configuration, the stabilizer bar subassembly 30 may include a pair of drop links 340, a pair of intermediate links 342, and a stabilizer bar 344. One drop link 340 may extend from the arm 282 to a first end au intermediate link 342. A second end of the intermediate link 342 may be coupled to a first end of the stabilizer bar 344. A mirror image arrangement of the drop link and intermediate link may be provided with an opposing wheel. For instance, another drop link 340 may extend from the arm 282 of a platform 50 that is provided with an opposing wheel to a first end of another intermediate link 342, which in turn may extend to a second end of the stabilizer bar 344 that may be disposed opposite the first end. The drop links 340 may extend in an upward direction that may extend away from the upper control arm 46. The intermediate links 342 may extend substantially horizontally and in a rearward direction. As such, the drop links 340 and intermediate links 342 may help position the stabilizer bar 344 above the wheels and control arms and may help provide ample ground clearance.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A suspension system comprising:
   a knuckle carrier that has a hole;
   a control arm that is pivotally mounted to the knuckle carrier; and
   a pivot mechanism that is disposed in the hole and pivotally couples the control arm to the knuckle carrier, the pivot mechanism including:
   a pin having a shoulder, a threaded portion, and a first mounting hole and a second mounting hole that each receive a fastener that mounts the pin to the control arm, wherein the shoulder and the threaded portion are axially positioned between the first mounting hole and the second mounting hole;
   a first bearing assembly that receives the pin and engages the shoulder; and
   a preload nut that has a threaded region that mates with the threaded portion, wherein tightening the preload nut exerts a preload force on the first bearing assembly.

2. The suspension system of claim 1 wherein the control arm is an upper control arm.

3. The suspension system of claim 1 wherein the first bearing assembly has a first inner race that engages the pin and a first outer race that engages the knuckle carrier, wherein the shoulder engages the first inner race.

4. The suspension system of claim 3 further comprising a first seal that is disposed in the hole and that extends from the shoulder to the knuckle carrier.

5. The suspension system of claim 4 wherein the pin is rotatable about a pin axis, the shoulder has an outer shoulder surface that faces away from the pin axis, and the first seal extends from the outer shoulder surface to the knuckle carrier.

6. A suspension system comprising:
   a knuckle carrier that has a hole;
   a control arm that is pivotally mounted to the knuckle carrier; and
   a pivot mechanism that is disposed in the hole and pivotally couples the control arm to the knuckle carrier, the pivot mechanism including;
   a pin having a shoulder and a threaded portion;
   a first bearing assembly that receives the pin and engages the shoulder; and
   a second bearing assembly that is disposed in the hole and receives the pin; and a preload nut that has a threaded region that mates with the threaded portion, wherein the preload nut engages the second bearing assembly and tightening the preload nut exerts a preload force on the first bearing assembly.

7. The suspension system of claim 6 wherein the pin has a first mounting hole and a second mounting hole that each receive a fastener that mounts the pin to the control arm, wherein the shoulder and the threaded portion are axially positioned between the first mounting hole and the second mounting hole.

8. The suspension system of claim 6 wherein the second bearing assembly has a second inner race that engages the pin and a second outer race that engages the knuckle carrier, wherein the preload nut engages the second inner race.

9. The suspension system of claim 8 wherein the knuckle carrier has an intermediate portion that is disposed in the hole and extends from the first bearing assembly to the second bearing assembly, wherein a first step surface extends from a first end of the intermediate portion to a first bearing support surface and a second step surface extends from a second end of the intermediate portion to a second bearing support surface, wherein the first bearing support surface and the second bearing support surface have a larger diameter than the intermediate portion, a first outer race of the first bearing assembly engages the first step surface, and the second outer race engages the second step surface to inhibit axial movement of the first outer race toward the second outer race.

10. The suspension system of claim 9 further comprising a second seal that is disposed in the hole and that extends from the preload nut to the knuckle carrier.

11. The suspension system of claim 10 wherein the preload nut has an outer surface that faces away from the pin and extends from an end of the preload nut and a flange that extends radially outward with respect to the outer surface, wherein the second seal extends from the outer surface to the knuckle carrier.

12. The suspension system of claim 9 wherein a first seal is disposed in the hole and extends from the shoulder to the knuckle carrier, and the knuckle carrier has a first outer step surface that extends from an end of the first bearing support surface that is disposed opposite the first step surface to a first seal support surface, and a second outer step surface that extends from an end of the second bearing support surface that is disposed opposite the second step surface to a second seal support surface, wherein the first seal extends from the shoulder to the first seal support surface, and a second seal extends from the preload nut to the second seal support surface.

13. A suspension system comprising:
a knuckle carrier that has a hole and a mounting stem;
a steering knuckle that is pivotally mounted to the knuckle carrier along an axis of rotation;
an upper control arm that is pivotally mounted to the knuckle carrier along a first control arm axis;
a platform that is fixedly disposed on the mounting stem and located above the upper control arm, wherein the platform supports an air spring and has an arm that is coupled to a stabilizer bar subassembly; and
a pivot mechanism that is disposed in the hole and pivotally couples the upper control arm to the knuckle carrier, the pivot mechanism including;
a pin having a shoulder and a threaded portion;
a first bearing assembly that receives the pin and engages the shoulder; and
a preload nut that has a threaded region that mates with the threaded portion, wherein tightening the preload nut exerts a preload force on the first bearing assembly.

14. The suspension system of claim 13 wherein the arm extends along an arm axis and the arm axis is substantially parallel to the first control arm axis.

15. The suspension system of claim 13 wherein the arm extends in a rearward longitudinal direction.

16. The suspension system of claim 13 wherein the platform has a disc portion that engages the air spring and is coupled to the mounting stem and the arm extends tangentially from the disc portion.

17. The suspension system of claim 13 wherein the mounting stem extends away from the steering knuckle.

18. The suspension system of claim 13 wherein the stabilizer bar subassembly is disposed above the upper control arm and the knuckle carrier.

19. The suspension system of claim 18 wherein the stabilizer bar subassembly includes a drop link that extends from the arm to a stabilizer bar such that the drop link extends in an upward direction that extends away from the upper control arm.

20. The suspension system of claim 13 wherein the knuckle carrier has an upper hole that facilitates mounting of the upper control arm, a lower hole that facilitates mounting of a lower control arm, a shock absorber mount disposed above the lower hole that has first and second mounting tabs that extend from opposing first and second sides of the knuckle carrier, respectively, a neck portion disposed above the shock absorber mount, and a connecting web that extends from the upper hole to the shock absorber mount, wherein the connecting web is offset from a center plane of the knuckle carrier such that the connecting web extends to the first mounting tab to partially define the first side and does not extend to the second mounting tab, thereby partially defining a clearance recess between the connecting web and the second side.

* * * * *